United States Patent
Lin et al.

(10) Patent No.: US 10,345,633 B2
(45) Date of Patent: Jul. 9, 2019

(54) PIXEL STRUCTURE, DISPLAY PANEL AND OPERATION METHOD THEREOF

(71) Applicant: Acer Incorporated, New Taipei (TW)

(72) Inventors: Jia-Yu Lin, New Taipei (TW);
Jin-Ting Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/666,579

(22) Filed: Aug. 2, 2017

(65) Prior Publication Data
US 2018/0173029 A1    Jun. 21, 2018

(30) Foreign Application Priority Data

Dec. 15, 2016    (TW) .............................. 105141522 A (51) Int. Cl.
| | |
|---|---|
| *G02F 1/1335* | (2006.01) |
| *G02F 1/13* | (2006.01) |
| *G02F 1/1362* | (2006.01) |
| *G02F 1/1368* | (2006.01) |
| *G02B 26/08* | (2006.01) |
| *G02F 1/1333* | (2006.01) |

(52) U.S. Cl.
CPC ....... *G02F 1/1323* (2013.01); *G02B 26/0833* (2013.01); *G02F 1/1368* (2013.01); *G02F 1/133553* (2013.01); *G02F 1/136286* (2013.01); *G02F 2001/133357* (2013.01); *G02F 2201/123* (2013.01)

(58) Field of Classification Search
CPC ............. G02F 1/1323; G02F 1/133553; G02F 1/136286; G02F 1/1368; G02F 1/135555; G02F 1/0072; G02F 2201/123; G02F 2203/02; G02F 2203/09; G09G 2310/0262

See application file for complete search history.

(56) References Cited

U.S. PATENT DOCUMENTS

| | | | |
|---|---|---|---|
| 9,007,676 B1 | 4/2015 | Kastalsky et al. | |
| 2009/0128890 A1* | 5/2009 | Sugimoto | .......... G02B 26/0841 359/316 |
| 2010/0149469 A1* | 6/2010 | Hunt | ................. G02F 1/133553 349/114 |

FOREIGN PATENT DOCUMENTS

| | | |
|---|---|---|
| CN | 102236224 | 11/2011 |
| CN | 102246090 | 11/2011 |
| TW | I249191 | 2/2006 |
| TW | I510827 | 12/2015 |

* cited by examiner

*Primary Examiner* — Angela K Davison
(74) *Attorney, Agent, or Firm* — JCIPRNET (57) ABSTRACT

A pixel structure including an element region and a viewing angle adjustment region is provided. The pixel structure includes a scan line, a first data line, a second data line, a first active element, a second active element, a planarization layer, and a reflective electrode. The first active element is electrically connected to the scan line and the first data line. The second active element is electrically connected to the scan line and the second data line. The reflective electrode is disposed on the planarization layer and electrically connected to the second active element. The reflective electrode has a fixed portion located in the element region and a cantilever portion located in the viewing angle adjustment region. The cantilever portion is connected to the fixed portion and is suspended. A display panel and an operation method of the display panel are also provided.

8 Claims, 8 Drawing Sheets

PIXEL STRUCTURE, DISPLAY PANEL AND OPERATION METHOD THEREOF

CROSS-REFERENCE TO RELATED APPLICATION

This application claims the priority benefit of Taiwan application serial no. 105141522, filed on Dec. 15, 2016. The entirety of the above-mentioned patent application is hereby incorporated by reference herein and made a part of this specification.

FIELD OF THE INVENTION

The invention relates to a pixel structure, a display panel and an operation method thereof. More particularly, the invention relates to a pixel structure with an adjustable viewing angle, a display panel, and an operation method thereof.

DESCRIPTION OF RELATED ART

Color washout easily occurs in a conventional display panel (e.g., a transmissive display panel) when the conventional display panel is placed outdoor or irradiated by strong light, leading to a reduction of contrast and a decrease in display quality. In addition, when a viewing angle of a user changes, for example, when the viewing angle is tilted up, down, to the left, or to the right, a brightness, a contrast, or color of a screen is likely to be shifted, resulting in distortion or color shift. A contrast ratio of 10:1 is generally defined by the industry as the limit of the viewing angle. At present, methods for improving the viewing angle mainly emphasize on how to increase the viewing angle (i.e., expanding a range of the viewing angle). However, when a placement angle of the display panel is changed, the methods may still not be able to effectively prevent the user from seeing the images with distortion or color shift.

SUMMARY OF THE INVENTION

The invention provides a pixel structure, a display panel and an operation method thereof suitable for fixing problems such as image distortion or color shift resulting from a change of a placement angle.

In an embodiment of the invention, a pixel structure has an element region and a viewing angle adjustment region. The pixel structure is disposed on a substrate and includes a scan line, a first data line, a second data line, a first active element, a second active element, a planarization layer, and a reflective electrode. The first data line and the second data line intersect with the scan line, respectively. The first active element is located in the element region and electrically connected to the scan line and the first data line. The second active element is located in the element region and electrically connected to the scan line and the second data line. The planarization layer covers the scan line, the first data line, the second data line, the first active element, and the second active element. The reflective electrode is disposed on the planarization layer and electrically connected to the second active element. The reflective electrode has a fixed portion located in the element region and a cantilever portion located in the viewing angle adjustment region. The cantilever portion is connected to the fixed portion, and the cantilever portion is suspended.

In an embodiment of the invention, a display panel includes a plurality of the pixel structures, an opposite substrate, and a display medium. The pixel structures are disposed on the substrate. The opposite substrate is opposite to the substrate. The display medium is disposed between the substrate and the opposite substrate.

In an embodiment of the invention, an operation method of the display panel includes following steps. The display panel is provided. Whether a placement angle of the display panel is changed is detected. A change of the placement angle is calculated if the placement angle is changed. A warping angle of the cantilever portion is changed according to the change of the placement angle of the display panel.

In view of the foregoing, a control signal may be dynamically fed back to the cantilever portion according to the change of the placement angle of the display panel, so as to adjust the warping angle of the cantilever portion and thereby dynamically adjust the viewing angle. Hence, the pixel structure, the display panel and the operation method thereof provided in the embodiments of the invention are suitable for fixing problems such as image distortion or color shift resulting from the change of the placement angle.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
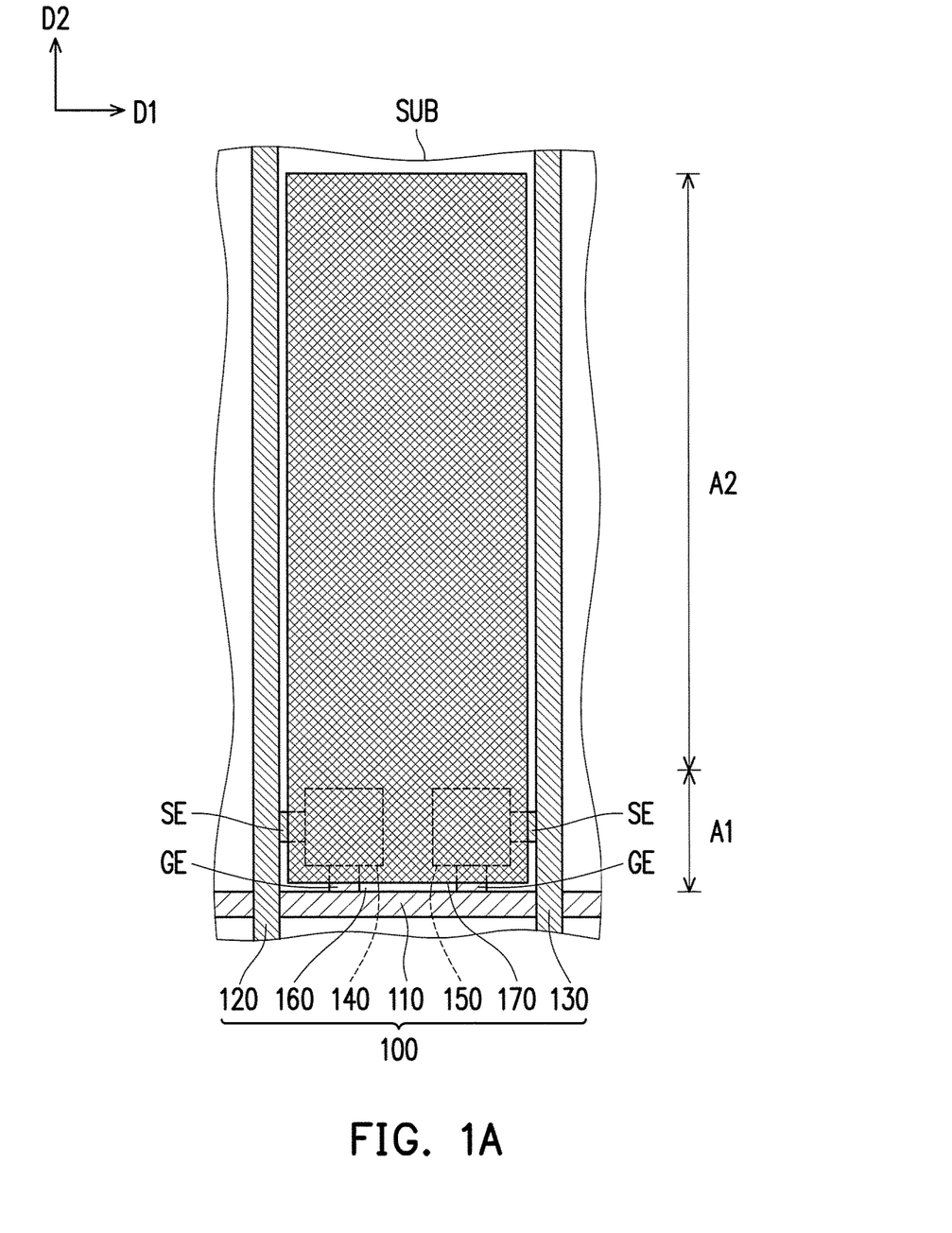
FIG. 1A is a schematic top view of a pixel structure according to a first embodiment of the invention.
Figure 1B:
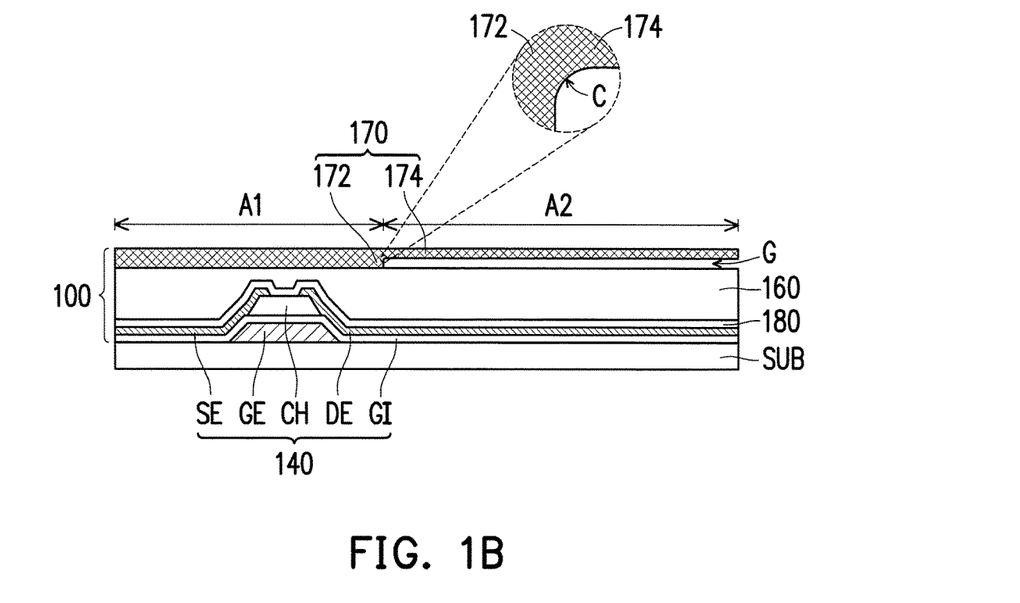
FIG. 1B and FIG. 1C are respectively schematic cross-sectional views of the pixel structure in FIG. 1A.
Figure 1C:
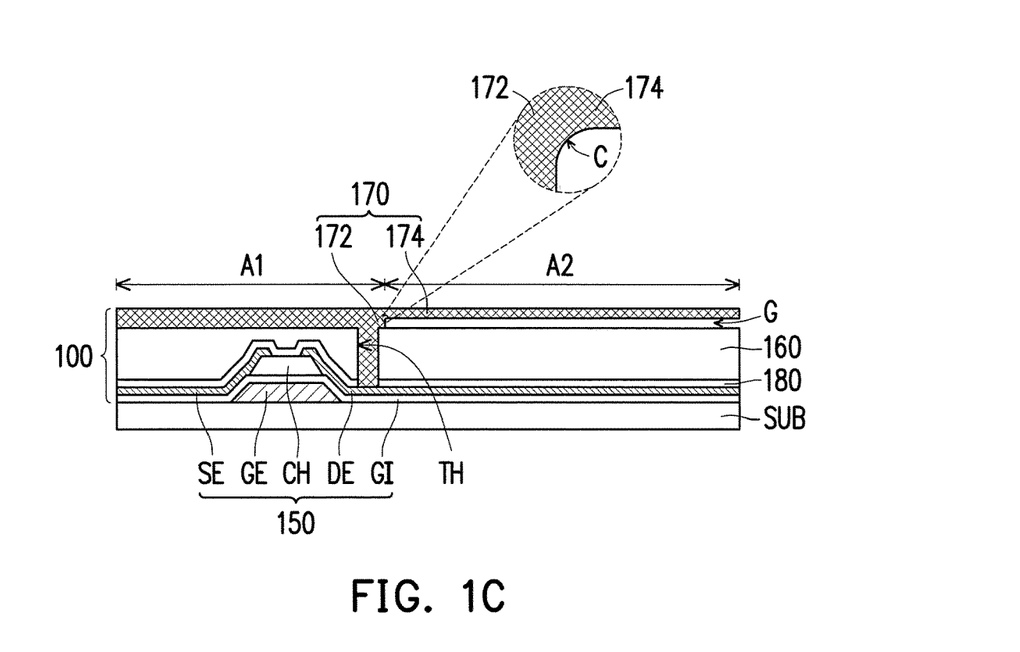
Figure 1D:
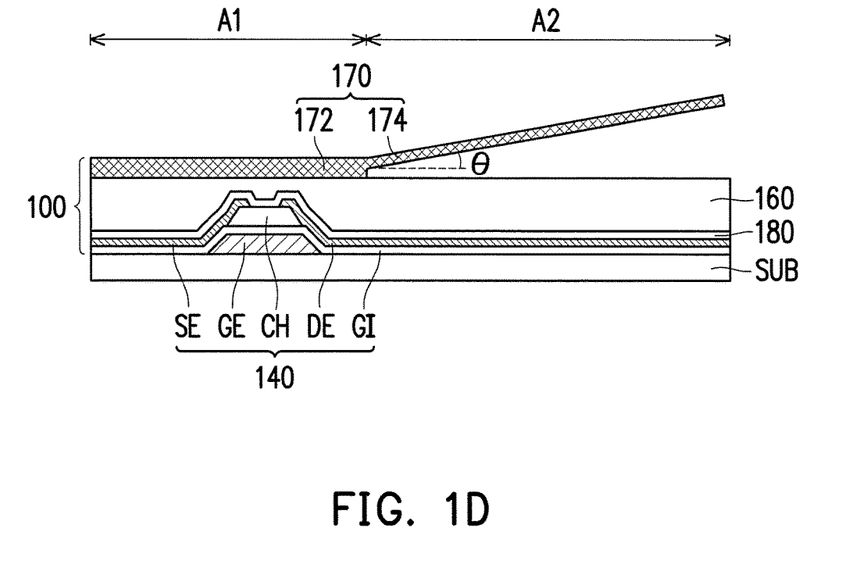
FIG. 1D is a schematic cross-sectional view illustrating a warped cantilever portion corresponding to FIG. 1B.

FIG. 1A is a schematic top view of a pixel structure according to a first embodiment of the invention. FIG. 1B and FIG. 1C are respectively schematic cross-sectional views of the pixel structure in FIG. 1A. FIG. 1D is a schematic cross-sectional view illustrating a warped cantilever portion corresponding to FIG. 1B.

Referring to FIG. 1A to FIG. 1C, a pixel structure 100 provided in the embodiment has an element region A1 and a viewing angle adjustment region A2. The viewing angle adjustment region A2 is located at a side of the element region A1 and connected to the element region A1. The pixel structure 100 is disposed on a substrate SUB and includes a scan line 110, a first data line 120, a second data line 130, a first active element 140, a second active element 150, a planarization layer 160, and a reflective electrode 170.

The first data line 120 and the second data line 130 intersect with the scan line 110, respectively. In the embodiment, the scan line 110 is extended along a first direction D1, and the first data line 120 and the second data line 130 are respectively extended along a second direction D2. The second direction D2 and the first direction D1 intersect with each other, for example, perpendicular to each other, but the invention is not limited thereto.

The first active element 140 is located in the element region A1 and electrically connected to the scan line 110 and the first data line 120. The second active element 150 is located in the element region A1 and electrically connected to the scan line 110 and the second data line 130. Furthermore, the first active element 140 and the second active element 150 may respectively include a gate electrode GE, a gate insulation layer GI, a channel layer CH, a source electrode SE, and a drain electrode DE. The gate insulation layer GI is disposed on the gate electrode GE as well as on the substrate SUB. The channel layer CH is disposed on the gate insulation layer GI and is located above the gate electrode GE. The source electrode SE and the drain electrode DE are located on the gate insulation layer GI and respectively extended to opposite sides of the channel layer CH, such that partial regions of the gate insulation layer GI are respectively covered. However, the stacking orders of film layers of the first active element 140 and the second active element 150 are not limited thereto.

The gate electrode GE of the first active element 140 and the gate electrode GE of the second active element 150 are electrically connected to the scan line 110. The source electrode SE of the first active element 140 is electrically connected to the first data line 120, and the source electrode SE of the second active element 150 is electrically connected to the second data line 130. In the embodiment, the scan line 110, the gate electrode GE of the first active element 140, and the gate electrode GE of the second active element 150 are, for example, collectively formed by patterning a first conductive layer, while the first data line 120, the second data line 130, the source electrode SE of the first active element 140, and the source electrode SE of the second active element 150 are, for example, formed by patterning a second conductive layer, but the invention is not limited thereto.

The planarization layer 160 covers the scan line 110, the first data line 120, the second data line 130, the first active element 140, and the second active element 150. For instance, the planarization layer 160 is, for example, an organic insulation layer, but the invention is not limited thereto. In the embodiment, the pixel structure 100 may alternatively include an insulation layer 180. The scan line 110, the first data line 120, the second data line 130, the first active element 140, and the second active element 150 may be sequentially covered by the insulation layer 180 and the planarization layer 160. The insulation layer 180 may be an inorganic insulation layer to achieve water-resistant and antioxidant effects.

The reflective electrode 170 is disposed on the planarization layer 160 and electrically connected to the second active element 150. Specifically, the planarization layer 160 and the insulation layer 180 may be formed with a through hole TH. A portion region of the drain electrode DE of the second active element 150 is exposed by the through hole TH, and the reflective electrode 170 may be electrically connected to the drain electrode DE of the second active element 150 through the through hole TH. In the embodiment, as shown in FIG. 1, the first data line 120 and the second data line 130 are respectively located on opposite sides of the reflective electrode 170, but the invention is not limited thereto. The first data line 120 and the second data line 130 may also be located on the same side of the reflective electrode 170 according to different design requirements.

The reflective electrode 170 has a fixed portion 172 located in the element region A1 and a cantilever portion 174 located in the viewing angle adjustment region A2. The cantilever portion 174 is connected to the fixed portion 172, and the cantilever portion 174 is suspended. Specifically, a gap G exists between the cantilever portion 174 and the planarization layer 160, meaning that the cantilever portion 174 and the planarization layer 160 are separated from each other. Therefore, the cantilever portion 174 is able to swing (warp) when a connection part between the cantilever portion 174 and the fixed portion 172 acts as a swing axle.

In the embodiment, as shown in FIG. 1D, the drain electrode DE of the first active element 140 is extended into the viewing angle adjustment region A2 from the element region A1, and a warping angle θ of the cantilever portion 174 is changed according to a mutual repulsion between the cantilever portion 174 and the drain electrode DE of the first active element 140. Furthermore, when the warping angle θ of the cantilever portion 174 is required to be changed, a control signal may be outputted to the drain electrode DE of the first active element 140 and the cantilever portion 174, and thereby the mutual repulsion (e.g., a magnetic repulsion force) is generated between the drain electrode DE of the first active element 140 and the cantilever portion 174. The cantilever portion 174 is therefore warped. If the warping angle θ of the cantilever portion 174 is adjusted whenever necessary according to the placement angle of a mobile apparatus, the viewing angle may thus be expanded effectively and instantaneously, and problems, such as image distortion or color shift resulting from the change of the placement angle, may thereby be resolved.

In addition, a turning portion C between the fixed portion 172 and the cantilever portion 174 may be designed as a rounded corner, so as to prevent stress concentration and obtain the desired lifetime.

Figure 2A:
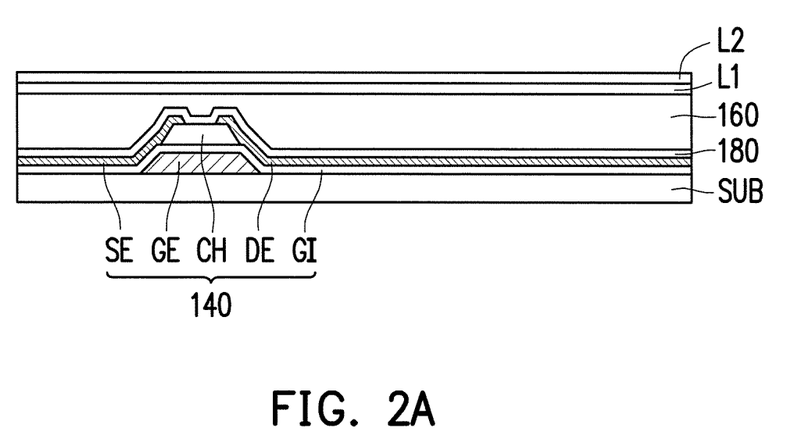
FIG. 2A to FIG. 2D are schematic cross-sectional views illustrating a process for fabricating the reflective electrode in FIG. 1B.
Figure 2B:
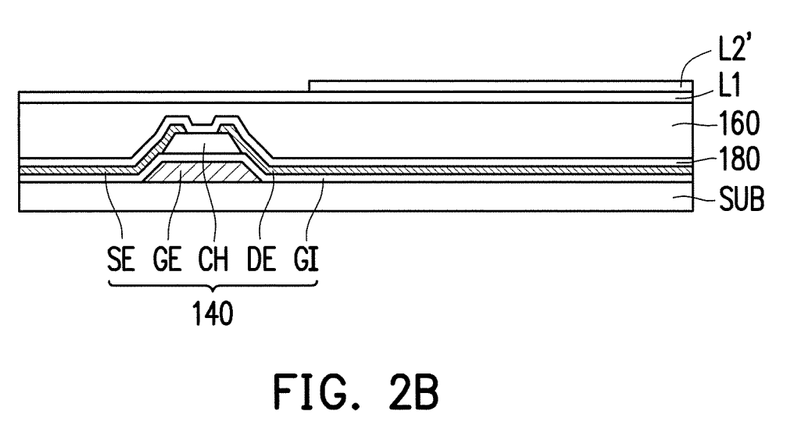
Figure 2C:
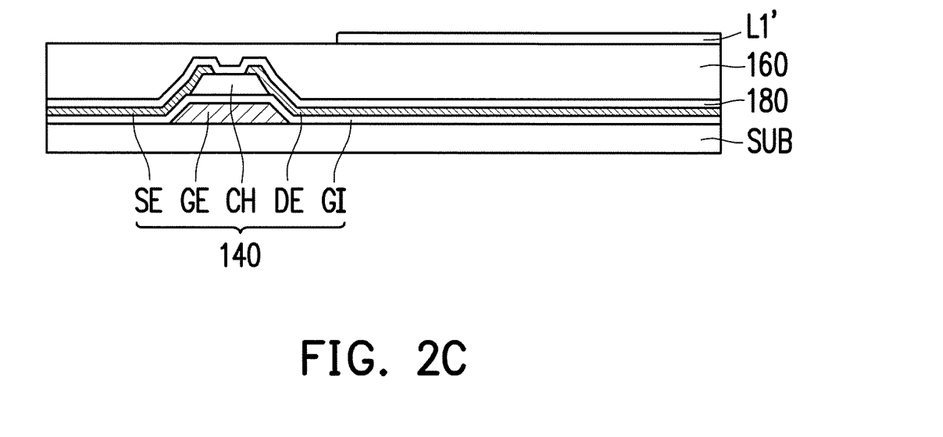
Figure 2D:
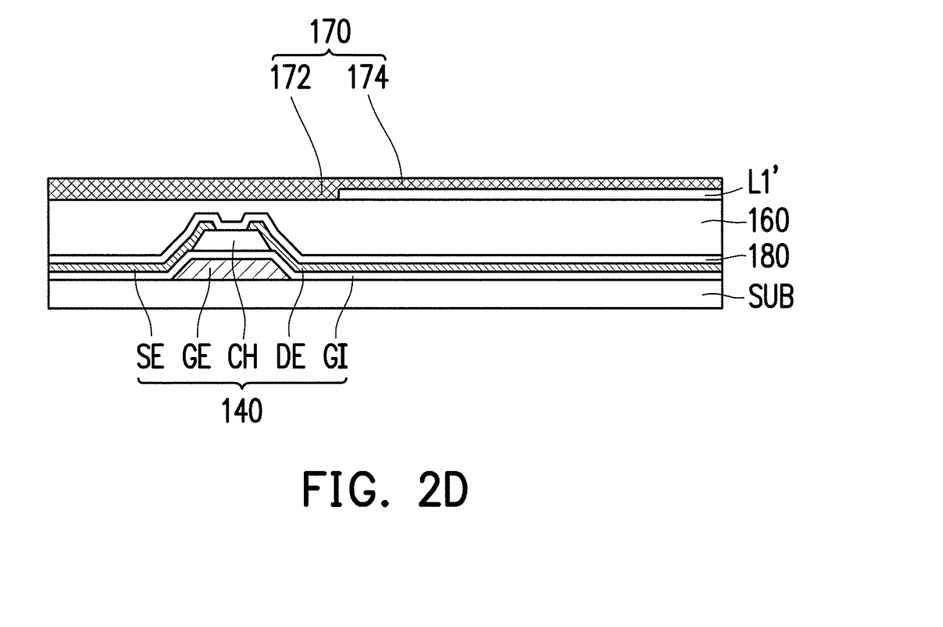

FIG. 2A to FIG. 2D are schematic cross-sectional views illustrating a process for fabricating the reflective electrode in FIG. 1B. After the planarization layer 160 is formed, a sacrificial layer L1 and a photoresist layer L2 may be sequentially formed on the planarization layer 160 (as shown in FIG. 2A). Next, the photoresist layer L2 is patterned to form a patterned photoresist layer L2' (as shown in FIG. 2B). A method of patterning the photoresist layer L2 may include etching, but the invention is not limited thereto. The patterned photoresist layer L2' is then used as a mask to pattern the sacrificial layer L1, such that a patterned sacrificial layer L1' is formed (as shown in FIG. 2C). A method of patterning the sacrificial layer L1 may include etching, but the invention is not limited thereto. Thereafter, the reflective electrode 170 is formed on the planarization layer 160 and the patterned sacrificial layer L1' (as shown in FIG. 2D). The patterned sacrificial layer L1' is removed, and the fabrication of the reflective electrode 170 is completed.

It should be noted that the method of fabricating the reflective electrode 170 is not limited to the fabrication process shown in FIG. 2A to FIG. 2D. In another embodiment, the reflective electrode 170 may also be formed through electroforming and embossing. Specifically, a male mold pattern may be formed on a roller in advance, and then the male mold pattern is impressed on a sacrificial layer to form a female mold of the reflective electrode 170. The female mold of the reflective electrode 170 is then filled with the material of the reflective electrode, so as to complete the fabrication of the reflective electrode 170.

Figure 3A:
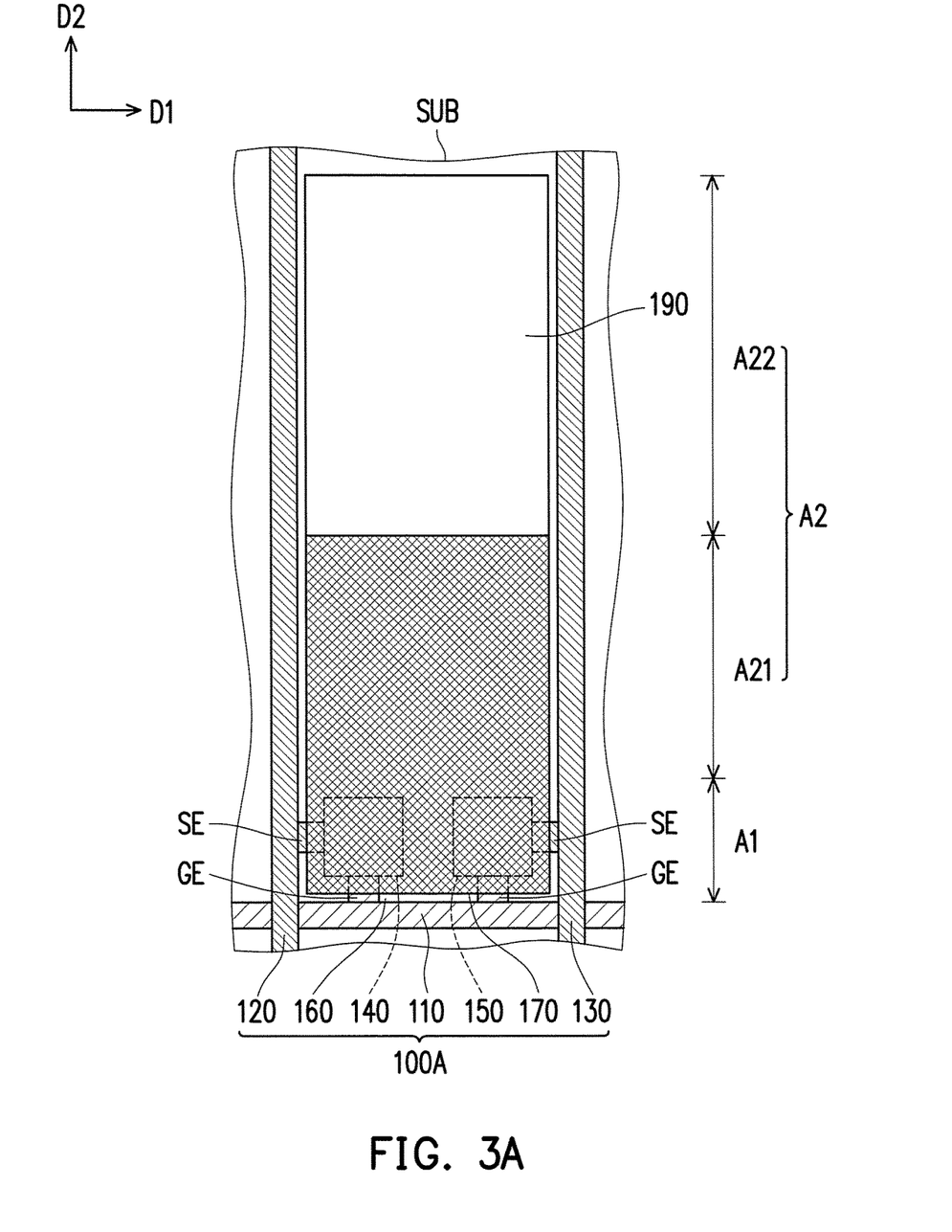
FIG. 3A is a schematic top view of a pixel structure according to a second embodiment of the invention.
Figure 3B:
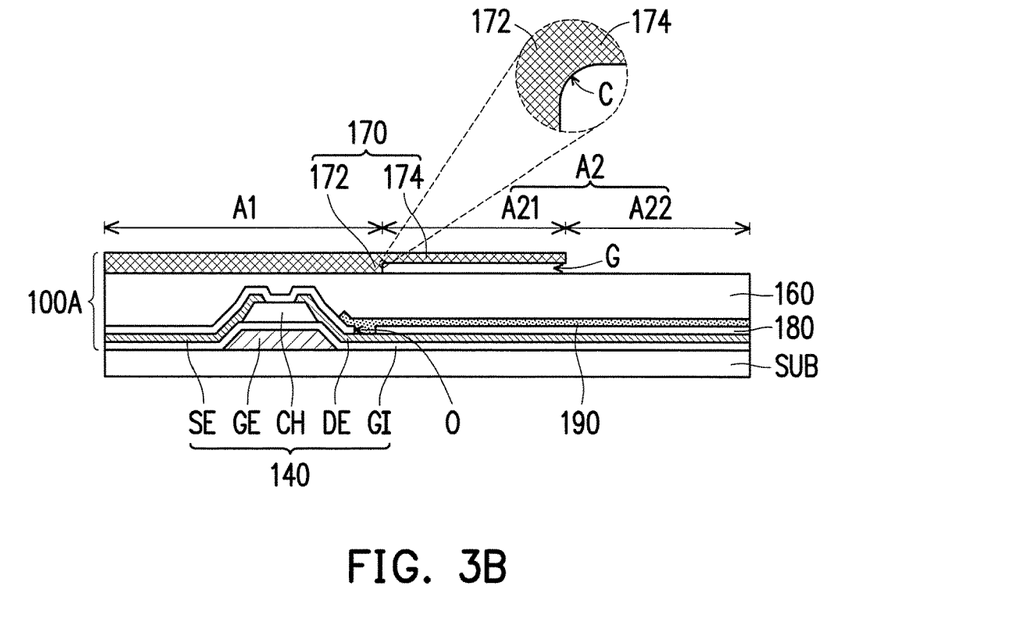
FIG. 3B and FIG. 3C are respectively schematic cross-sectional views of the pixel structure in FIG. 3A.
Figure 3C:
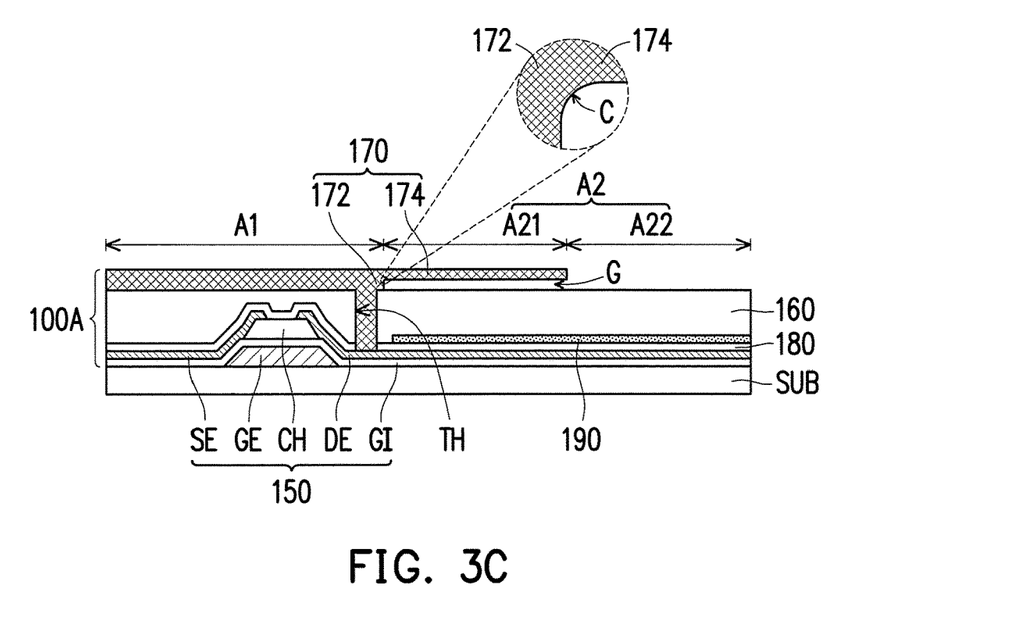

The pixel structure 100 is described in other embodiments with reference to FIG. 3A to FIG. 3C, and identical or similar elements are denoted by the same or similar reference numerals, which will not be described again hereinafter. FIG. 3A is a schematic top view of a pixel structure according to a second embodiment of the invention. FIG. 3B and FIG. 3C are respectively schematic cross-sectional views of the pixel structure in FIG. 3A.

Referring to FIG. 3A to FIG. 3C, differences between a pixel structure 100A in the embodiment and the pixel structure 100 in FIG. 1A to FIG. 1D are described below. In the pixel structure 100A, the viewing angle adjustment region A2 has a reflective region A21 and a transmissive region A22. The transmissive region A22 is connected to the reflective region A21, and the reflective region A21 is located between the transmissive region A22 and the element region A1. The cantilever portion 174 is located in the reflective region A21 and exposes the transmissive region A22.

In addition, the pixel structure 100A further includes a pixel electrode 190. The pixel electrode 190 is electrically connected to the first active element 140 and extended into the transmissive region A22 from the reflective region A21. Specifically, the pixel electrode 190 is disposed on an insulation layer 180. The insulation layer 180 may be formed with an opening O. A portion of the drain electrode DE of the first active element 140 is exposed by the opening O, and the pixel electrode 190 may be electrically connected to the drain electrode DE of the first active element 140 through the opening O.

In the embodiment, when the warping angle of the cantilever portion 174 is required to be changed, the control signal may be outputted to the pixel electrode 190 and the cantilever portion 174, and the warping angle of the cantilever portion 174 is thereby changed according to a mutual repulsion (e.g., a magnetic repulsion force) generated between the cantilever portion 174 and the pixel structure 190. If the warping angle of the cantilever portion 174 is adjusted whenever necessary according to the placement angle of the mobile apparatus, the viewing angle may be expanded effectively and instantaneously, and problems, such as image distortion or color shift resulting from the change of the placement angle, may thereby be resolved.

Figure 4:
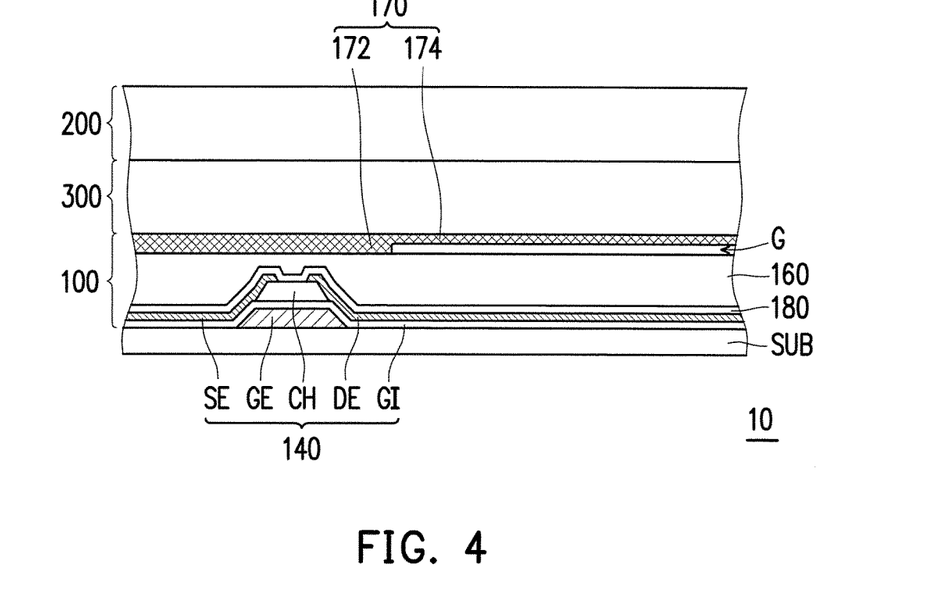
FIG. 4 is a schematic cross-sectional view of a display panel according to an embodiment of the invention.

FIG. 4 is a schematic cross-sectional view of a display panel according to an embodiment of the invention. Referring to FIG. 4, a display panel 10 in the embodiment includes a plurality of the pixel structures 100 (only one pixel structure 100 is schematically illustrated in FIG. 4), an opposite substrate 200, and a display medium 300. The pixel structure 100 is disposed on the substrate SUB. The opposite substrate 200 is opposite to the substrate SUB. The display medium 300 is disposed between the substrate SUB and the opposite substrate 200. The display medium 300 is, for example, a liquid crystal layer, but the invention is not limited thereto.

In this embodiment, the display panel 10 is, for example, a reflective display panel, but the invention is not limited thereto. In another embodiment, a plurality of the pixel structures 100A as shown in FIG. 3A to FIG. 3C may be adopted by the display panel 10, such that the display panel 10 may be a transflective display panel.

Figure 5:
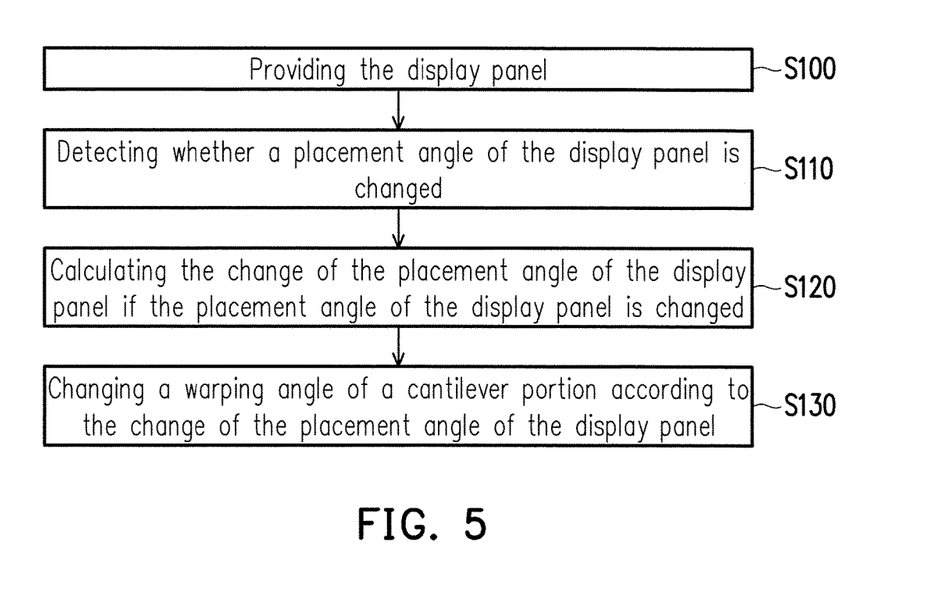
FIG. 5 is a schematic flow chart of an operation method of a display panel according to an embodiment of the invention.

FIG. 5 is a schematic flow chart of an operation method of a display panel according to an embodiment of the invention. The operation method of the display panel in the embodiment includes following steps. Referring to FIG. 1D, FIG. 4, and FIG. 5, first, the display panel 10 is provided (step S100). The display panel 10 may be constructed in a mobile apparatus, but the invention is not limited thereto. Next, whether a placement angle of the display panel 10 is changed is detected (step S110); for example, a G-sensor constructed in the mobile apparatus may be applied to detect whether the placement angle of the display panel 10 is changed. When the mobile apparatus is tilted, the display panel 10 and the G-sensor located in the mobile apparatus are also tilted, and thereby whether the placement angle of the display panel 10 is changed and the change of the placement angle may be determined according to whether a signal is generated by the G-sensor and how strong the signal is. When the placement angle of the display panel 10 is changed, the change of the placement angle of the display panel 10 is calculated (step S120); for example, the change of the placement angle may be calculated through a micro-controller unit constructed in the mobile apparatus according to the signal generated by the G-sensor. Next, the warping angle $\theta$ of the cantilever portion 174 is changed according to the change of the placement angle of the display panel 10 (step S130). A method of changing the warping angle $\theta$ of the cantilever portion 174 includes outputting the control signal to the drain electrode DE of the first active element 140 and the cantilever portion 174 through the first data line 120 and the second data line 130. Therefore, the warping angle $\theta$ of the cantilever portion 174 may be changed according to the mutual repulsion between the cantilever portion 174 and the drain electrode DE of the first active element 140 (as shown in FIG. 1D). Alternately, the warping angle $\theta$ may also be changed (as shown in FIG. 3B) by the cantilever portion 174 according to the mutual repulsion between the cantilever portion 174 and the pixel electrode 190 (electrically connected to the drain electrode DE of the first active element 140).

In view of the foregoing, the control signal may be dynamically fed back to the cantilever portion according to the change of the placement angle of the display panel, so as to adjust the warping angle of the cantilever portion and thereby dynamically adjust the viewing angle. Hence, the pixel structure, the display panel and the operation method thereof provided in the embodiments of the invention are suitable for fixing problems such as image distortion or color shift resulting from the change of the placement angle.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A pixel structure, having an element region and a viewing angle adjustment region, and the pixel structure being disposed on a substrate and comprising:
   a scan line;
   a first data line, intersecting with the scan line;
   a second data line, intersecting with the scan line;
   a first active element, disposed in the element region and electrically connected to the scan line and the first data line;
   a second active element, disposed in the element region and electrically connected to the scan line and the second data line;

a planarization layer, covering the scan line, the first data line, the second data line, the first active element, and the second active element; and a reflective electrode, disposed on the planarization layer and electrically connected to the second active element, wherein the reflective electrode has a fixed portion located in the element region and a cantilever portion located in the viewing angle adjustment region, the cantilever portion is connected to the fixed portion, and the cantilever portion is suspended, wherein a turning portion between the fixed portion and the cantilever portion is designed as a rounded corner.

2. The pixel structure as claimed in claim 1, wherein a drain electrode of the first active element extends into the viewing angle adjustment region from the element region, and a warping angle of the cantilever portion is changed according to a mutual repulsion between the cantilever portion and the drain electrode of the first active element.

3. The pixel structure as claimed in claim 1, wherein the viewing angle adjustment region has a reflective region and a transmissive region, and the cantilever portion is located in the reflective region and exposes the transmissive region, the pixel structure further comprising:

a pixel electrode, electrically connected to the first active element and extended into the transmissive region from the reflective region, wherein a warping angle of the cantilever portion is changed according to a mutual repulsion between the cantilever portion and the pixel electrode.

4. A display panel, comprising:

a plurality of the pixel structures as claimed in claim 1, disposed on the substrate;

an opposite substrate, opposite to the substrate; and a display medium, disposed between the substrate and the opposite substrate.

5. The display panel as claimed in claim 4, wherein a drain electrode of the first active element extends into the viewing angle adjustment region from the element region, and a warping angle of the cantilever portion is changed according to a mutual repulsion between the cantilever portion and the drain electrode of the first active element.

6. The display panel as claimed in claim 4, wherein the viewing angle adjustment region has a reflective region and a transmissive region, and the cantilever portion is located in the reflective region and exposes the transmissive region, the pixel structure further comprising:

a pixel electrode, electrically connected to the first active element and extended into the transmissive region from the reflective region, wherein a warping angle of the cantilever portion is changed according to a mutual repulsion between the cantilever portion and the pixel electrode.

7. A method of operating a display panel, comprising:

providing the display panel as claimed in claim 4;

detecting whether a placement angle of the display panel is changed;

calculating the change of the placement angle of the display panel when the placement angle of the display panel is changed; and changing a warping angle of the cantilever portion according to the change of the placement angle of the display panel.

8. The method as claimed in claim 7, wherein a method of changing the warping angle of the cantilever portion comprises:

outputting a control signal to the drain electrode of the first active element and the cantilever portion through the first data line and the second data line.

* * * * *